Feb. 2, 1954    R. E. RUNDELL ET AL    2,668,056
BOWLING PIN CONVEYING AND ASSEMBLING MECHANISM
FOR BOWLING PIN SETTING MACHINES
Filed Oct. 31, 1947    6 Sheets-Sheet 1

INVENTOR
RUPERT E. RUNDELL
BY   PETER M. NEJEDLY.
ATTORNEY

Feb. 2, 1954  R. E. RUNDELL ET AL  2,668,056
BOWLING PIN CONVEYING AND ASSEMBLING MECHANISM
FOR BOWLING PIN SETTING MACHINES
Filed Oct. 31, 1947  6 Sheets-Sheet 4

INVENTOR
RUPERT E. RUNDELL
PETER M. NEJEDLY.
BY Wentworth B. Clapham
ATTORNEY

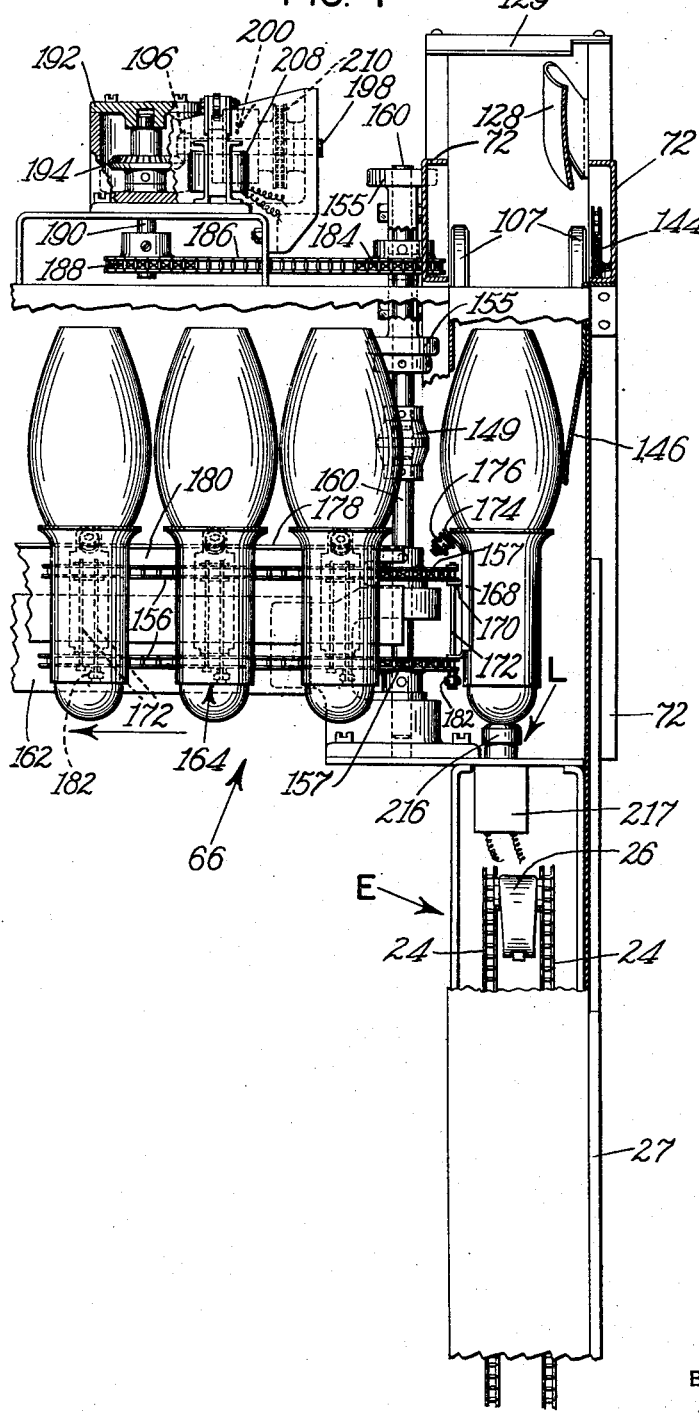

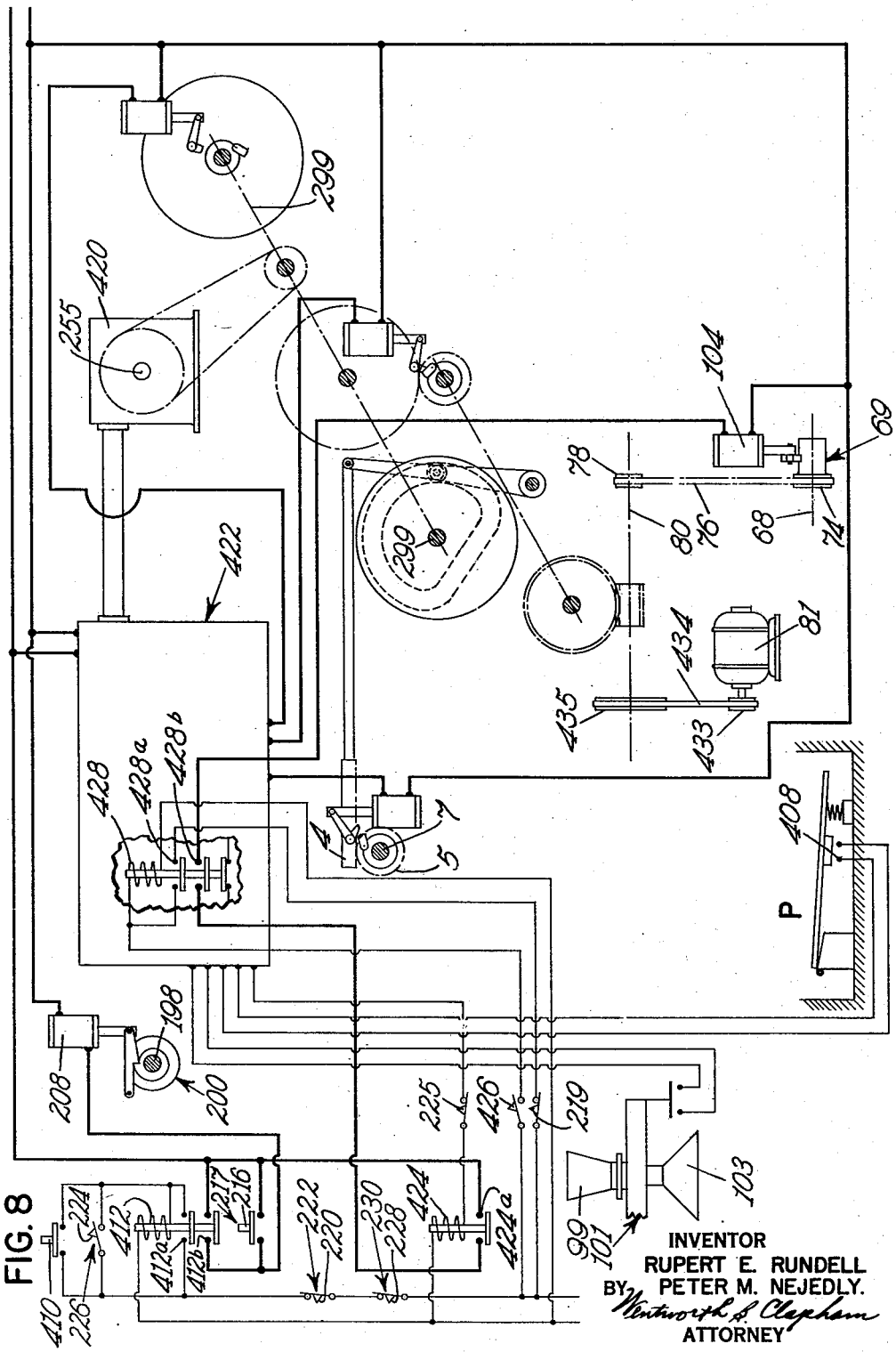

Patented Feb. 2, 1954

2,668,056

UNITED STATES PATENT OFFICE 2,668,056

BOWLING PIN CONVEYING AND ASSEMBLING MECHANISM FOR BOWLING PIN SETTING MACHINES

Rupert E. Rundell, Rockville Centre, and Peter M. Nejedly, Brooklyn, N. Y., assignors to American Machine and Foundry Company, a corporation of New Jersey Application October 31, 1947, Serial No. 783,348

18 Claims. (Cl. 273—43)

This invention relates to bowling pin setting machines and more particularly to improvements in automatic bowling pin spotting machines having mechanism for spotting and respotting pins.

Bowling pins are subjected to considerable wear and tear due to the impact of balls striking them, falling into the pit, and being conveyed by pin handling mechanisms to a position where they can be further conveyed or delivered into a pin spotter for spotting on an alley.

The problem of handling pins expeditiously and at the same time with a minimum amount of rough treatment in order to prolong the pin life is important to all bowling alley proprietors. The present invention constitutes a solution of this problem in that it greatly minimizes the handling of pins and the wear and tear thereon, and at the same time makes it possible to use damaged pins or pins which have been dressed and turned down so that efficient conveying and locating takes place despite the fact that some of the pins handled may not conform exactly with American Bowling Congress specifications.

This desirable advance in the art is accomplished by providing individual pin supporting members which receive pins in succession from a conveying system and correctly space and position them at a delivery station where they are removed and delivered to a pin spotter.

Each pin is so handled and located that little or no difficulty arises incident to the delivery of the necessary number of pins, usually ten, into the spotter for final placement on the pin spotting bed of the bowling alley.

It is an object of our invention to provide novel bowling pin handling mechanism for a bowling pin spotting machine.

It is a further object of our invention to provide in a bowling pin spotting machine, pin handling mechanism capable of delivering pins to a delivery station in proper spaced relationship, regardless of the maximum diameter of any pin or variations in height thereof due to dressing operations performed on pins being handled.

It is a further object of our invention to provide in an automatic pin spotting machine, an endless chain conveying mechanism provided with spaced pin supporting holders or cups, and mechanism for presenting the cups seriatim to a loading position where a bowling pin is placed in each cup so that ultimately ten loaded cups can transfer ten pins, the usual number required for play, to a position for delivery into a pin spotter for placement on the bed of a bowling alley.

With these and other objects not specifically mentioned in view, the invention consists in certain combinations and constructions which will be hereinafter fully described, and then set forth in the claims hereunto appended.

In the accompanying drawings which illustrate a preferred embodiment of the invention and form a part of this specification, and in which like characters of reference indicate the same or like parts:

Figure 7 is a side elevation of a portion of the pin assembling mechanism; and

Figure 8 is a wiring diagram showing a suitable circuit for controlling the several parts of the machine.

This invention is particularly adaptable for use in a machine of the general type disclosed in Rundell patent, No. 2,388,707, issued November 13, 1945; Schmidt application, Serial No. 636,737 for Bowling Pin Setting Machine, filed December 22, 1945, now Patent 2,578,319, issued December 11, 1951; and Broekhuysen application, Serial No. 627,605, filed November 9, 1945, now Patent 2,559,274, granted July 3, 1951. Its use is not to be considered limited to such machines, however, since it may find ready application in other types of bowling pin spotting machines.

In the machines disclosed and described in the above referred to patent and applications, bowling pins delivered into the pit of an alley are raised by conveying mechanism and are conveyed by mechanism forming a part of the general conveying system between a pair of spaced spiral members designed to arrange bowling pins entering therebetween into an aligned assembly awaiting delivery therefrom to a pin spotter by means of a pin transfer device.

As mentioned hereinabove, due to wear and tear it is necessary to dress and/or repair bowling pins in order to prolong their periods of use and maintain operating costs as low as possible. Where it is necessary to dress down or turn a pin so as to reduce its girth such that its maximum diameter is also reduced, it sometimes happens that when a plurality of bowling pins, usually ten or eleven, is fed between the two spaced pin supporting members awaiting delivery by the transfer device to the pin spotters, the longitudinal axes of the pins may be improperly positioned with respect to the grippers of the transfer device which engage the several pins in the aligned assembly, hold them firmly, and deliver them to the pin spotters.

The present invention constitutes a solution of this problem inasmuch as it makes possible the delivery of pins to a pin delivery station where each pin is substantially accurately positioned for proper engagement and removal by the pin transfer grippers to the pin spotters.

Figure 1:
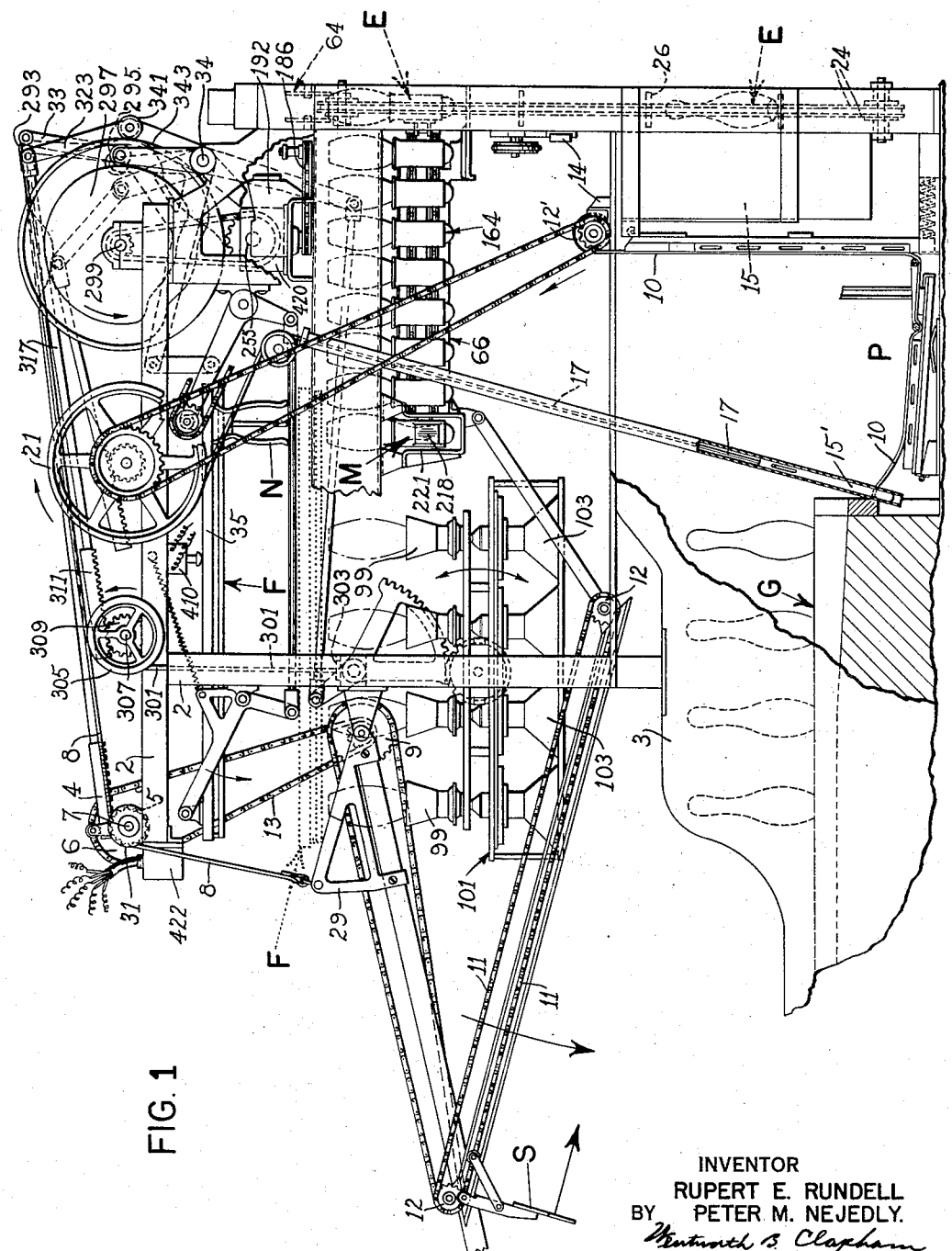
Figure 1 is a partial side elevation of a bowling pin spotting machine embodying the invention.
Figure 2:
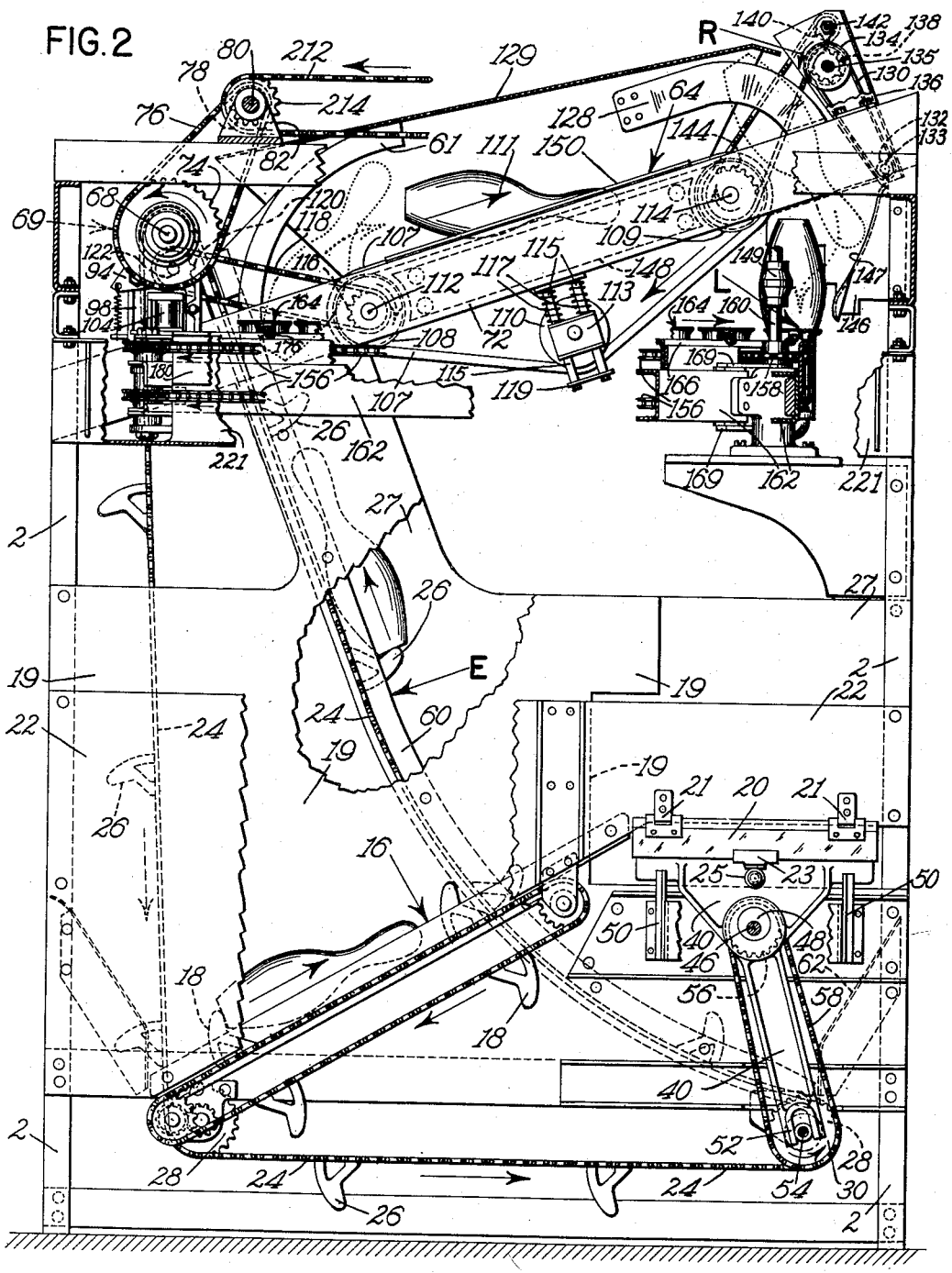
Figure 2 is a front elevation taken on line 2—2 of Figure 3, with parts broken away, illustrating the mechanism employed for elevating pins for selective delivery to the pin distributing device and the storage device.
Figure 3:
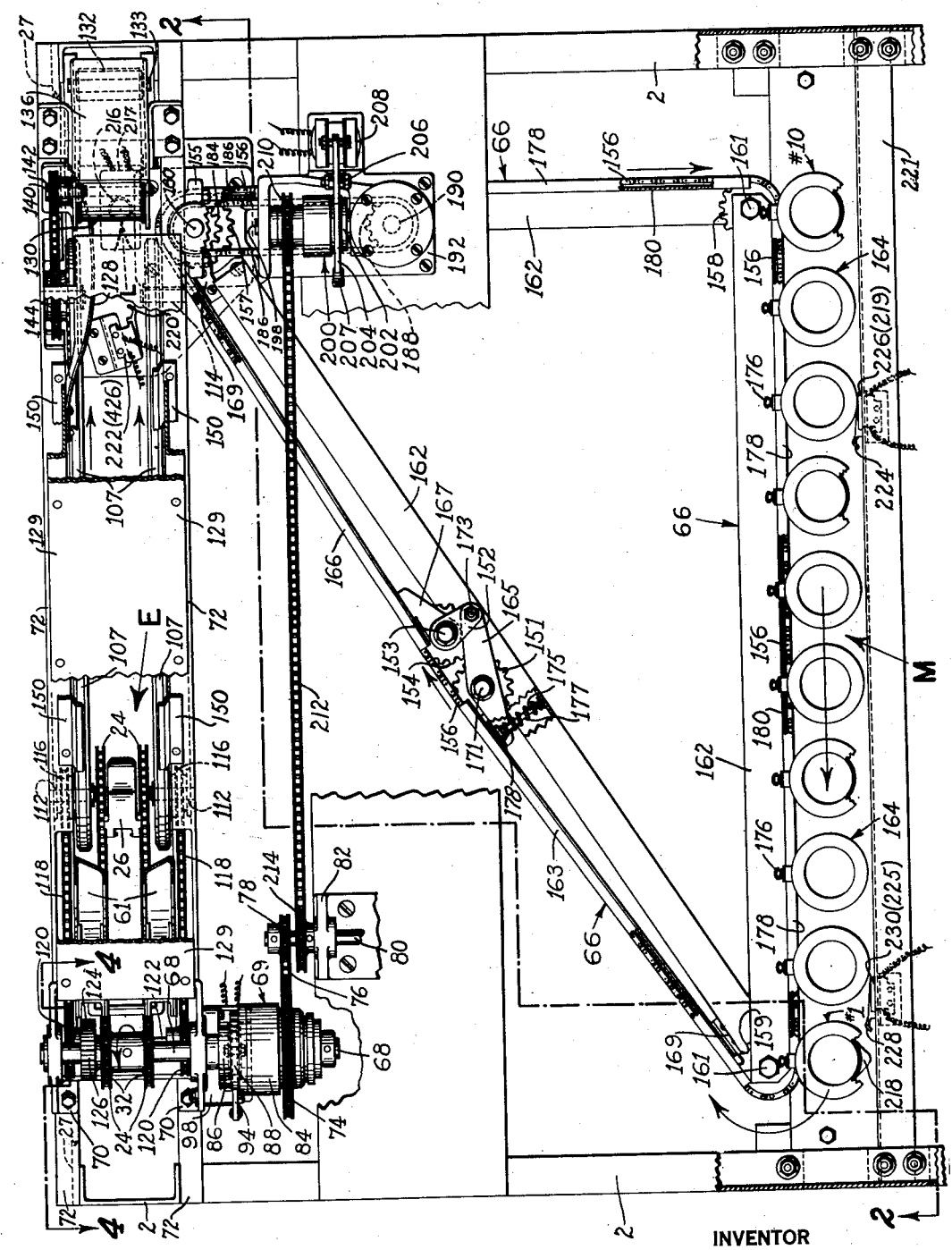
Figure 3 is a plan view of the rear portion of the pin spotting machine, showing the relative position of the pin distributing device with respect to the pin elevating conveyor.

Referring to the drawings in Figures 1, 2 and 3, there is shown a bowling pin spotting machine of the general type referred to consisting of side frames 2 between which are supported the several operating parts of the machine. Side frames 2 are adapted to be supported on the kick backs 3 of a bowling alley.

A sweep S (as shown in Figure 1) is constructed and operated in a manner similar to that shown and described in Schmidt Patent 2,578,319 by means of rack 4 and pinion 5. Sweep S is lowered into operative position relative to an alley G for sweeping deadwood and unwanted standing pins into the pit P onto apron 10 which at the proper time is raised to deliver pins rearwardly between the transverse ball guides 14 into chamber 15 from whence the pins are conveyed by mechanism described more in detail hereinafter.

Sweep S is attached to chains 11 running on sprockets 12 driven by a suitable chain running on a lower sprocket (not shown), and a sprocket 9 which in turn is driven by chain 13 running on sprocket 6 attached to shaft 7 which is rotated by rack 4, and pinion 5, as described. At the proper time during the operation of the machine, in a manner similar to that described in said Schmidt patent, the rotation of a suitable cam (not shown) on shaft 299, which is tracked by cam follower 295 on lever 293 causes the movement of rack 4 and hence the desired rotation of pinion 5 to effect the operation of moving the sweep S back and forth along the pin supporting portion of the alley. Sweep S is raised and lowered at the proper time during the operation of the machine by means of cable 8, secured to sweep bracket 29, which runs on pulley 31 loose on shaft 7. One end of cable 8 is secured to lever 33, loosely mounted on shaft 34, having a follower (not shown) engaging a suitable cam (not shown) on shaft 299. A suitable guard (not shown) is employed to prevent a player from rolling a ball down the alley during the operation of spotting and respotting pins. After the pins and a ball have been swept into the pit they are received upon a flexible apron 10 which may be similar in construction and operation to that described in Schmidt Patent 2,578,319. One end of the apron is attached to slide blocks 15' adapted to be moved by cables 17 upwardly to a discharge position; the other end is attached to a roller 12'. When the apron is wound up, pins and balls carried thereby are ejected by the apron rearwardly therefrom.

The ball is deposited upon and rolls along transverse guideways 14 which deliver it onto a ball return runway of conventional design extending along the alley. Pins drop downwardly between rails 14 into pin receiving chamber 15. Some of the pins are received directly upon the upper run of an inclined transverse conveyor 16 (Figure 2) having flights 18 which carry the pins upwardly towards the center of the machine. Pins at the other side of the center of the machine pass downwardly upon a rearwardly inclined oscillated plate 20 having its upper edge pivoted at 21 on the transverse wall or panel 22.

Plate 20 directs any pins falling onto it rearwardly into engagement with the lower, upwardly moving end of the main elevating conveyor E (Figure 2). Elevator E comprises a pair of spaced chains 24 mounting spaced pin carrying fingers 26. The construction and operation of elevator E is similar to that disclosed in Rundell patent, No. 2,388,707 except that the pin elevating flight portion is more inclined. Chains 24 run on idler sprockets 28, and driving sprockets 32, the latter being located adjacent the top portion of the conveyor E. The drive for sprockets 32 is described more in detail hereinafter.

The provision of conveyor 16 in chamber 15 at one side of the machine and deflector plate 20 at the other side thereof enables pins received in chamber 15 to be spread out for elevating and delivery, since pins delivered to plate 20 are received directly upon and carried upwardly by elevator E while pins on conveyor 16 are directed subsequently by that conveyor to the lower portion of elevator E after other pins have moved out of the way.

The oscillating movement of plate 20 is effective in preventing jams of pins. Plate 20 is provided adjacent its lower end with a projection 23 resting on a roller 25 mounted on the upper end of an oscillator 40 which is given a short up and down vibratory motion to cause plate 20 to oscillate about its pivots 21. Oscillator 40 (as shown in Figure 2) is provided with an eccentric portion 48 on shaft 46 rotatably mounted in oscillator 40 whereby the latter is moved up and down as shaft 46 rotates.

In order to control the movement of oscillator 40, which is confined by the projections 50 secured to a transverse channel attached to the rear of the machine, at the lower end oscillator 40 is provided with a yoke 52 straddling the projecting end of shaft 54 to which is fixed sprocket 28. To drive shaft 46 and eccentric 48, shaft 46 has mounted thereon, a sprocket 56 about which runs a chain 58 receiving movement from the sprocket 30 secured to shaft 54 mentioned hereinabove. A laterally inclined plate 62 (Figure 2) mounted between the two spaced transverse panels 19, 27 assists in directing pins downwardly from plate 20 towards the active pin elevating portion of conveyor E which is confined between panels 19 and 27.

Bowling pins delivered from the pit of the alley onto conveyor E are moved by flights 26 upwardly one by one (as shown in Figures 1 and 2) between guides 60 suitably supported between spaced transverse panels 19, 27 at the rear of the machine. The upper end portions 61 of guides 60 are curved and preferably overhang conveyors 64 in order to assist in the proper delivery and disposition of pins one by one into conveyor 64. Since the general construction and operation of conveyor E is substantially the same as that shown in the above referred to Rundell patent, a detailed description thereof is deemed unnecessary.

Figure 4:
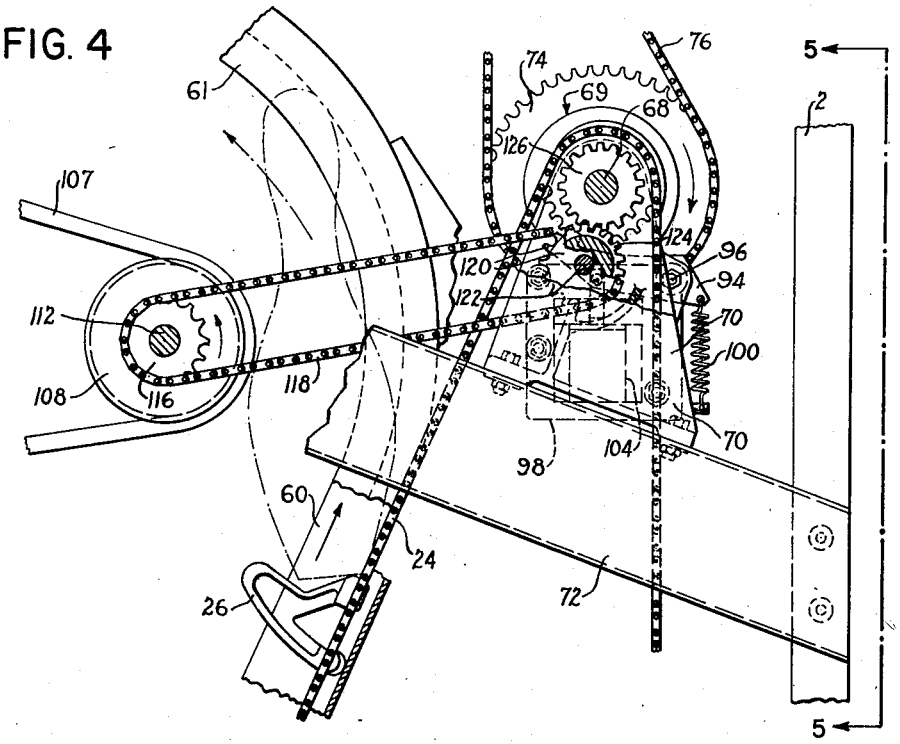
Figure 4 is a detailed view of the pin elevating conveyor drive taken on line 4—4 of Figure 3.

Sprockets 32 at the upper end of elevator E are mounted on shaft 68 journalled in bracket 70 fastened to the upper flanges of spaced transverse channel members 72 of the frame (Figure 4). One end of shaft 68 mounts a combined coupling and drive device or clutch 69 which includes a sprocket 74 tracked by a chain 76 driven from sprocket 78 mounted on the main drive shaft 80 operatively supported in a bracket 82 secured to the frame of the machine.

Shaft 80 is driven continuously from motor 81 and actuates conveyor E and its associated conveyors during the operation of the machine. The desired drive is effected by means of a driving pulley 433 fast to the shaft of motor 81. A belt 434 running on pulley 433 drives a pulley 435 fixed to shaft 80.

Figure 5:
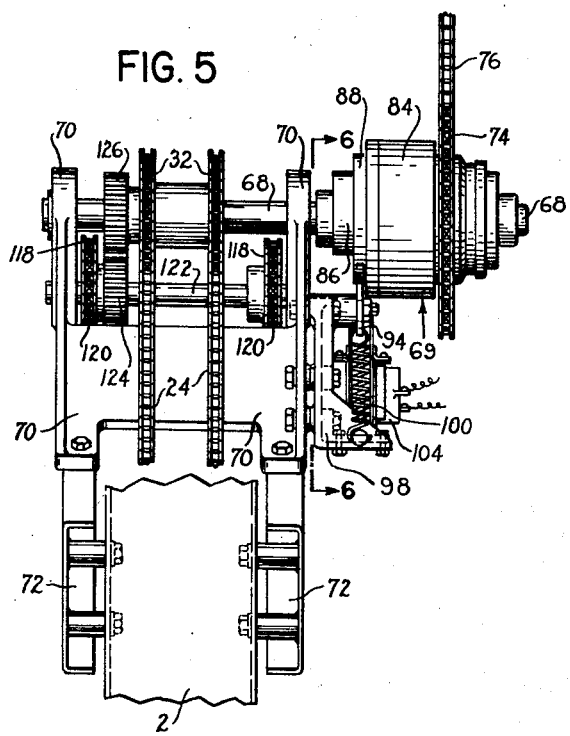
Figure 5 is a view taken on line 5—5 of Figure 4.
Figure 6:
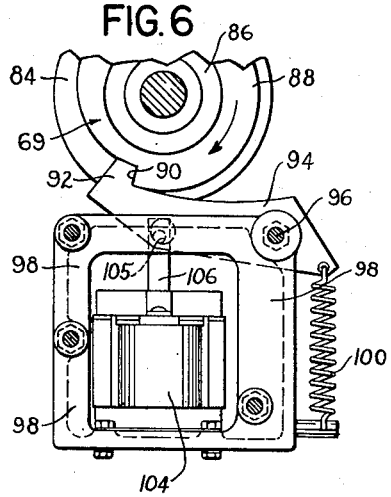
Figure 6 is an elevation taken on line 6—6 of Figure 5.

Clutch 69 may be of any suitable well known type. A preferred form is a one-revolution clutch of the type made by the Hilliard Corporation, 512 Fifth Avenue, New York, New York, described in Clutch Bulletin 239, page 2. In general, the clutch consists of a driving, and a driven member, which are coupled and uncoupled in well known manner when it is desired to drive or stop the movement of conveyor E and other mechanisms associated therewith. Driving member 84 is loosely mounted on shaft 68; coacting driven portion 86 is fixed to shaft 68. Sprocket 74 which is associated with driving portion 84 may be formed integrally therewith or secured thereto in any suitable manner. Driven part 86 includes a cam 88 having a tooth 90 arranged to engage with a tooth 92 on a clutch operating lever 94 pivoted at 96 on a mount 98 at one side of bracket 70 (Figure 5). A spring 100 having one end attached to lever 94 and the other secured to a pin in mount 98 urges tooth 92 towards cam 88 for engagement with tooth 90 thereof.

The operation of elevator E continues so long as tooth 92 is held out of engagement with tooth 90 on cam 88. This is effected by means of solenoid 104 which is provided with an armature 106 pivotally connected at 105 to lever 94. During the operation of elevator E, solenoid 104 is energized. However, in the operation of the machine, if it is desired to interrupt the rotation of shaft 68 and stop the movement of elevator E, solenoid 104 is deenergized whereupon spring 100 swings lever 94 and locates tooth 92 in the path of travel of tooth 90 on cam 88. Clutch 69 is disengaged when tooth 92 engages tooth 90.

Bowling pins elevated by means of conveyor E through the medium of flights 26 may be raised either head foremost or bottom foremost. As each pin reaches the uppermost portion of conveyor E, it is guided by curved guides 61 forwardly and away from conveyor E and discharged into a pin transfer conveyor, designated generally 64.

In the embodiment selected for purposes of illustration, pin transfer conveyor 64 is so positioned with respect to the uppermost portion of conveyor E that pins are delivered one by one therefrom between spaced conveyors, such as endless belts 107 running on pulleys 108, 109 and 110.

Belts 107 are so mounted that each pin delivered therebetween will tend to swing upon the belts into butt end up position with the head portion thereof depending downwardly between the belts and supporting channels or braces 72 secured to the frame of the machine. In this manner each pin discharged from pin transfer conveyor 64 will be arranged in handle end down position as indicated in Figure 2.

Belts 107 preferably are substantially polygonal in cross section and are so arranged that similar tapered sides thereof engage the tapered faces of the portion of each pin between the maximum diameter and the neck thereof. As shown in Figures 2 and 4, the pin supporting and conveying laps of belts 107 are inclined upwardly from the point of delivery of a pin from conveyor E to the discharge station above and adjacent the pin assembling conveyor, described in detail hereinafter.

The distance between belts 107 is always greater than the maximum diameter of the head of a bowling pin but less than the maximum diameter of the belly portion thereof. Belts 107 are driven in the direction of arrow 111 (Figure 2). Pulleys 108 which support belts 107 are fixed to aligned stub shafts 112 (Figure 3). Pulleys 109 are secured to stub shafts 114 journalled in transverse channels 72. Pulleys 110 are journalled in blocks 113 slidably mounted on rods 115 suitably attached to cross channels 72. Blocks 113 are urged by springs 117 outwardly towards plates 119 fixed to the free ends of rods 115. In this manner the proper yielding tension is maintained at all times in belts 107 and all slack is automatically taken up.

Attached to shafts 112 are sprockets 116 on which run sprocket chains 118 tracking sprockets 120 fixed to shaft 122 journalled in bracket 70. Shaft 122 has secured thereto a pinion 124 meshing with pinion 126 fast to shaft 68. It is evident that whenever elevator E is operated, belts 107 of conveyor 64 are also driven through the connections just described.

Due to the spacing and type of belts 107 employed for conveying pins delivered by conveyor E to discharge position for delivery to a pin transport device, such as an assembling conveyor, designated generally 66, each pin tends automatically to assume a head-down position, indicated in dotted lines in Figure 2, but mechanism is also provided for insuring that all pins are so delivered. An elongated transverse hood 129 having downwardly depending legs, is suitably mounted on the frame of the machine in such manner above conveyor E and belts 107 that bowling pins elevated by conveyor E are prevented from flying out of the machine and are properly guided by guides 60 onto belts 107. A curved guide member 128 suitably attached to hood 129 projects outwardly therefrom, as shown more clearly in Fig. 3, into the path of travel of bowling pins moving along conveyor 64. Curved guide member 128 acts to displace each pin sideways as it is discharged from belts 107 into a holder at station L. In this way each bowling pin is positioned properly for delivery at station L into a pin holder 164. Acting in conjunction with curved guide member 128 is a positively driven belt 130, driven in the direction indicated by arrow R (Fig. 2). Belt 130 exerts a frictional pull or drive upon the head of each pin moving toward position for discharge into pin assembling conveyor 66 such that each pin is given a positive push downwardly in the direction of the dotted arrow shown in Figure 2 into a pin holder forming a part of the pin assembling system.

Pin positioning conveyor 130 runs on idler pulley 132 and driving pulley 134. Pulley 132 is supported on shaft 133 suitably journalled in spaced parallel legs of a U-shaped bracket 136; pulley 134 is mounted on shaft 135 also suitably supported in bracket 136 which is attached to the frame of the machine.

Pulley 134 is driven during the operation of conveyor 64 by means of a sprocket chain running on sprocket 138 attached to shaft 135, which sprocket chain also runs on sprocket 140 fixed to shaft 142 journalled in bracket 136 and sprocket 144 fixed to one end of the shaft 114. It is apparent from what has been said that assembling conveyor 66, and guide member 128 and conveyor 130 insure the proper delivery of pins into empty holders 164.

Guide 146 is provided with a curved surface 147 located closely adjacent the position of delivery of a pin into a holder 164. Guide 146 is suitably mounted on a channel member of side frame 2 (as shown in Figure 2).

Bowling pins which pass head foremost from elevator E into transfer mechanism 64 are caused to travel head foremost along the same towards the point of discharge described above. Any bowling pins which are received butt end foremost by conveyor belts 107 assume a position, as they travel, in which the head portions thereof are positioned forwardly in the direction of travel prior to the time such pins arrive at the point of discharge. This action is accomplished by the combination of momentum due to the speed of belts 107, and gravity. The spacing of belts 107 and the relatively small area of contact thereof with the belly portion of each pin provide substantially spaced points of contact or pivots about which each pin can turn due to momentum and gravity as it is conveyed by conveyors 107 to the point of discharge.

Mounted on channels 72 and extending lengthwise between the respective sets of pulleys 108, 109 are two spaced vertical plates 148, the inner faces of which are disposed approximately in the planes of the inner faces of pulleys 108, 109. Actually the cross section of belts 107 is such that their inner edges are positioned to overhang slightly the planes of the faces of the pulleys and plates 148 so that pulleys 108, 109 do not obstruct the proper movement of pins being conveyed by belts 107. Plates 148 act to confine the pins and prevent them from tipping laterally relative to the path of travel towards channels 72 where they might, for example, strike against pulleys 109 or otherwise become jammed in conveyor mechanism 64.

To assist in maintaining the upper runs of belts 107 in substantially parallel movement and to prevent them from being spread apart by the weight of pins carried thereby, the upper flanges of the channels 72 have secured thereto inwardly directed belt guiding strips 150, the cross section of which is such that the belts may have a running fit therein.

In order to prevent pins traveling along conveyor mechanism 64 from becoming dislodged therefrom by upward movement or being turned end for end, an inverted U-shaped hood 129 is provided. This hood includes two similar spaced upright flanged side plates in the bottom of which are lugs secured to cross frames 72.

As mentioned hereinabove, one of the main problems solved by this invention is that of so handling and arranging bowling pins that, regardless of variations in the maximum diameter of pins or changes in length due to dressing down and repairing such pins, each pin conveyed to the delivery or loading station M will be positioned with its longitudinal axis substantially equidistant from the axes of adjacent pins similarly delivered to the loading station. In this manner the pin transfers N which remove the pins from the holders 164 of the pin assembling mechanism 66 can properly grip, remove the pins from the holders and deliver them to spotter units 99 on table 101 for placement on the playing bed of alley G.

Another problem which is solved is that of making it possible to use only the number of pins required for play, normally two full sets of pins. It is, therefore, unnecessary to break sets of pins or use odd pins in answering the needs of the machine insofar as the delivery station M is concerned.

The preferred form of pin assembling unit is shown in Figures 1, 2, 3 and 7. The pin assembly unit consists of two vertically spaced, horizontally positioned endless chain conveyors 156 running on driven sprockets 157 and idler sprockets 158 and 159 secured to vertical driving and driven shafts 160 and 161, respectively, supported in bracket 155 and suitable bearing brackets on top cross members 162, which are suitably attached to the frame of the machine. Shaft 160 which supports sprockets 157 may be made up of two aligned shaft units coupled together by a flexible shear coupling 149.

The triangular path of movement disclosed is employed because it makes possible a simple arrangement whereby pins can be delivered one by one into a plurality of cups or holders attached to the endless conveyors forming the mechanism and then moved into straight line assembled relationship for delivery to a pin spotter. If desired, a different path of movement in a closed path could be employed.

Attached to chains 156 and equidistantly spaced therealong are pin supporting cups or holders, designated generally 164. In the embodiment shown there are ten cups or holders 164. It is obvious, however, that any desired number of cups can be used.

Each cup has a substantially cylindrical body having an inside diameter greater than that of the handle or head end of a pin to be handled thereby in order to insure that each handle or head portion of a pin can enter freely and be disposed and supported properly in each cup 164. As shown in Figure 7, for example, each cup 164 is provided with a curved, upwardly flaring flanged part which assists in the vertical positioning of each pin deposited in a cup 164 and also tends to hold each pin in proper vertical arrangement during the step by step loading of the several cups and the final transfer of all loaded cups to the pin delivery station M where the desired number of pins, usually ten, is removed by pin transfers N and placed in pin spotters 99. Disclosure and description of the construction and operation of transfers N and the spotting and respotting mechanism which sets and resets bowling pins on a bowling alley is limited herein to a minimum since the specific elements of these mechanisms form no part of the invention. The structure of transfers N and the spotting and respotting mechanism is substantially the same as that shown in the above-referred to Rundell patent.

At the proper time during the operation of the machine, frame F which supports the transfers N, ten in number, moves downwardly under the action of a cam (not shown) to cause ten aligned transfer grippers N to grip aligned pins at station M. Continued rotation of this cam causes grippers N to move upwardly thereby removing pins from cups 164. By means of another cam 297 mounted on shaft 299, transfers N are moved along frame F and dispose the pins held therein in triangular arrangement above spotters 99. Further operation of the cam, which effects the raising and lowering of frame F causes transfers N to locate the handle ends of pins carried thereby in spotters 99 where they are gripped and held so that as transfer frame F rises, the pins remain in spotters 99. Since the mechanism for operating transfer frame F and grippers N is the same in construction and operation as that shown in the above referred to co-pending Schmidt application, Serial No. 636,737, further description and showing is omitted in the interest of brevity. The construction and operation of spotters 99 can be the same as shown and described in Rundell patent, No. 2,310,996.

During the continued operation of the machine, table 101 is lowered and turned and pins are left in spotted arrangement on the alley. Movement of table 101 to and from alley G is effected by suitable means, such as cables 301 attached to blocks 303 slidably supported in guides in side frames 2. Cables 301 are also attached to sheaves 305 on shaft 307 which mounts a pinion 309. A rack 311 meshing with pinion 309 and carried by rod 317 is reciprocated in proper timed relation to accomplish the proper movement of table 101 by means of lever 323 on which is mounted a cam follower 341 tracking cam 343 on shaft 299. Since the mechanism just described is substantially the same in construction and operation as that disclosed in Schmidt Patent 2,578,319, further description and showing herein is deemed unnecessary.

As shown in Figure 7, each cup is rigidly fastened in vertically upright position to a bracket 168 having upper and lower lugs 170 projecting therefrom through which a pair of pins 172 pass connecting the cups to chains 156 in a predetermined spaced relationship. At its upper end, each bracket 168 has an angular offset portion 174. As illustrated, this offset is substantially 45° from vertical and supports a roller 176 positioned to travel along the upper curved edge 178 of a series of guide plates 180 stationarily supported in the triangular form, as shown in Figure 3, in order to support and maintain the cups whether loaded or empty in upright position in their travel in a closed path in the direction of the arrows shown in Figure 3.

Plates 180 terminate adjacent each of the sprockets on which chains 156 run. One of each of the sets of pins 172 carries at its lower end a roller 182 adapted to run along the outer upright faces of channels 162 and guide portions 163, 166 in order to assist in maintaining the loaded and unloaded cups in substantially vertical upright position at all times.

In order to maintain proper tension in the conveyor system 66, which includes chains 156, a resilient slack take-up is provided. This device consists of two pivoted chain guide portions 163, 166 which form the longest side of the triangular path of movement along which chains 156 travel (see Figure 3). Plates 163, 166 at one end are attached to brackets 169 hingedly mounted on shafts 160, 161, respectively. At the free end of plate 163 is secured a U-shaped bracket 165 having mounted between its ends a shaft 171 on which are mounted spaced idler take-up sprockets 151. The free end of U-shaped bracket 165 supports stub shafts 173 (one of which is shown in Figure 3) forming pivotal connections for spaced parallel links 152 (one of which is shown in Figure 3) pivotally connected by a shaft 153 to spaced arms of bracket 167 fixed to the free end of the other plate 166. The pivot shaft 153 carried by the spaced arms of U-shaped bracket 167 also supports two spaced idler take-up sprockets 154.

A disc 178 attached to bracket 165 supports a horizontally positioned pin 175 extending outwardly therefrom towards channel 162 (Figure 3). A coiled expansion spring 177 encircles pin 175. One end of spring 177 bears against disc 178; its other end presses against the vertical web of channel 162. In this manner sprockets 151 and 154 are pressed outwardly into resilient engagement with chains 156, and the latter are always maintained properly tensioned so that any slack is taken up.

Sprocket 184 which drives shaft 160 in order to locate empty pin holders or cups 164 in pin receiving position relative to transfer mechanism 64 and to effect the delivery of ten loaded cups to pin delivery station M is driven by means of sprocket chain 186 which runs on sprocket 188 secured to shaft 190 journalled in a gear box 192 mounted on a suitable cross member of the machine. Shaft 190 mounts a bevelled gear 194 which meshes with bevelled pinion 196 secured to one end of a horizontal shaft 198 having two parts, one a driving and one a driven portion coupled by a one-revolution clutch 200. Clutch 200 may be similar in construction and operation to clutch 69 described hereinabove. Clutch 200 has a cam 202 attached to the driven part of shaft 198 which is controlled by a toothed lever 204 operative to engage and disengage a tooth (not shown) on cam 202 for coupling and uncoupling the driving and driven parts of shaft 198. Lever 204 is pivoted at 206 on housing 192, and is operatively controlled by a solenoid 208 in opposition to a pull-down spring 207. On the driving section of shaft 198 is mounted a sprocket 210 on which runs a chain 212 driven from sprocket 214 which in turn is driven by drive shaft 80 on which it is mounted.

As each bowling pin delivered from belts 107 drops into a pin holder 164 of pin assembling mechanism 66, the handle thereof strikes against a trigger 216 which closes a switch 217 in the control circuit to energize solenoid 208 and thereby effect a movement of lever 204 out of engagement with the tooth on cam 202 and cause one revolution of shaft 198 of clutch 200 to turn shaft 160 and index conveyor 66 one step. This removes a filled holder 164 from pin receiving position beneath belts 107, and locates the next empty holder at loading station L for disposition of a pin therein.

Further movement of conveyor 66 is interrupted until a pin is delivered into the empty holder 164 located beneath belts 107. Upon completion of the operation of filling ten successive cups, conveyor 66 is moved so as to travel all ten filled cups into aligned position at station M (as shown in Figure 3) ready for the removal of pins therefrom by transfer units N on frame F, as described hereinabove.

Attached to No. 1 pin holder 164 (as shown in Figure 3) is a lug 218 constructed and arranged to coact with the several switches positioned along the path of travel of the several cups or holders 164 which assist in controlling the operation of conveyor 66. After the removal of ten pins at station M for delivery to spotter units 99, by means of a control device described hereinabove, clutch 200 is engaged to effect the drive of shaft 160 and cause the empty pin holders 164 to travel from station M along that portion of the triangular path (shown in Figure 3) which extends between shafts 161, 160, and thereby locate No. 1 pin holder 164 in position to receive the next pin delivered by conveyors 107 to loading station L. As No. 1 pin holder moves into receiving position at loading station L, lug 218 engages trigger 220 (Figure 8) of switch 222 suitably secured to the frame of the machine.

The operating mechanism is so constructed that neither conveyor belts 107 nor conveyor E can operate until No. 1 empty pin holder has been located at loading station L. This includes a control described in detail hereinafter, which operates in conjunction with the driving mechanism of the conveyor 66 and prevents operation of pin transfer conveyor belts 107 and conveyor E until No. 1 empty pin holder has been located at loading station L. This mechanism prevents improper feed of pins to station L and also insures against pin clogs or jams and machine part breakage.

The opening of switch 222 breaks the circuit through solenoid 208 thereby deenergizing the solenoid. Spring 207 moves lever 204 to position the tooth on lever 204 for engagement with the tooth on cam 202 whereupon clutch 200 is disengaged, the drive of shaft 160 interrupted and No. 1 empty holder 164 is positioned for loading at station L directly over switch operating trigger 216. During the successive delivery of individual pins by belts 107 into the several empty cups on conveyor chains 156, engagement of the head of successive pins deposited in a holder 164 with trigger 216 will cause an intermittent drive of shaft 160 and effect a stepwise movement of loaded cups from station L and empty cups into position for loading at station L.

The step by step movement of conveyor chains 156 continues until the tenth pin or last pin of a set is placed in holder No. 10. At the time empty holder No. 10 is located at station L, lug 218 mounted on holder No. 1 is positioned for engagement with trigger 224 of control switch 226 (Figure 3). As soon as the last pin of a set or number 10 pin is deposited in #10 holder, solenoid 208 of the conveyor driving mechanism is energized and chains 156 begin their movement. Actuation of switch 226 as the result of the engagement of trigger 224 by lug 218 causes continued energization of solenoid 208 until all of the filled holders 164 have been positioned in aligned arrangement at station M awaiting removal of the pins therefrom and their delivery to pin spotter units 99. As the several loaded pin holders 164 move into their positions in magazine M, lug 218 engages trigger 228 of switch 230 and causes a deenergization of solenoid 208 at substantially the time pin holder No. 1 moves to its dwell position in storage M whereupon all of the loaded pin holders 164 are disposed in proper aligned relationship relative to transfers N which deliver them to the spotter units 99.

The several switches arranged along the path of travel of holders 164 preferably are adjustably mounted on brackets secured to the frame of the machine. The adjustable mounting of each of the switches makes it possible to so position each switch that empty holders are properly located at station L, and filled holders are accurately positioned at station M for delivery of pins to spotter units 99.

Since all ten cups are filled there is no necessity for continuing the operation of either the back end elevator E or pin transfer conveyors 107 and, therefore, as lug 218 engages trigger 224 it also engages the trigger of switch 219 (Figures 3 and 8) which effects the deenergization of solenoid 104 of clutch 69 and throws out the back end conveyor operating mechanism. Movement of the filled cups into aligned position at station M causes lug 218 to engage trigger 228 of switch 230 (Figure 3). Actuation of trigger 228 causes an opening of switch 230 and a breaking of the circuit through solenoid 208 thereby interrupting the drive of shaft 160 which stops the movement of conveyor 66.

The operation of the above described mechanism is substantially as follows:

After the first ball of a frame has been bowled and has come to rest in pit P, pit switch 400 is closed and there is then a short delay, after which time the main control 422 causes the machine to operate. The main control mechanism can be substantially the same as that shown and described in the above mentioned Broekhuysen application. Table 101 is moved downwardly at the same time the grippers N remove a set of pins from cups 164 of conveyor 66 at station M. Respotters 103 on table 101 are actuated to grip and lift any pins not knocked down as table 101 rises, at which time the grippers N deposit ten pins in spotter cups 99. In the meantime sweep S has operated and swept any fallen pins into pit P from which they are transferred by apron 10 to the rear elevator E and conveyor 16. Table 101, now carrying a full set of pins in spotters 99 and the pins which were standing on the alley in the respotters 103 goes down and respots the lifted pins in proper on or off-spot positions on alley G. Table 101 then rises and remains above alley G pending rolling of the next ball.

When grippers N lift the heads of the pins clear of the cups, frame F closes switch 410. This energizes relay 412 which is held in by its contacts 412a. Closing of contacts 412b energizes solenoid 208 which allows clutch 200 to engage and effect movement of the now empty train of cups towards loading station L.

During the travel of conveyor 66 a cam (not shown) mounted on shaft 255, inside cam box 420, closes a contact (not shown) which energizes and holds in relay 424 thereby keeping its contacts 424a closed.

As the No. 1 cup of conveyor 66 approaches loading station L, lug 218 on this cup momentarily engages trip arm 220 and opens switch 222 thereby deenergizing relay 412 and solenoid 208 which in turn disengages clutch 200. This stops the No. 1 cup at the loading station directly over switch 217 ready to receive a pin from the pins now being conveyed by elevator E because when lug 218 on the No. 1 cup open switch 222 it also momentarily closes switch 426, which is mounted beneath switch 222. The closing of switch 426 energizes relay 428 which is locked in by its contacts 428a. The closing of contacts 428b energizes solenoid 104 which allows the elevator clutch 69 to engage and start the elevator E and conveyors 64 and 16.

As a pin being delivered from conveyor 64 drops into the awaiting empty No. 1 cup of conveyor 66, the head of the pin strikes trigger 216 and closes switch 217 which energizes solenoid 208, actuates clutch 200 and allows conveyor 66 to index its train of cups so that the second empty cup advances to loading station L directly over switch 217 ready for the reception of the next pin to be delivered from belts 107 of conveyor 64.

This operation continues until the pin setting machine stops at the end of a normal first ball cycle at which time the above mentioned cam on shaft 255 (not shown) opens a switch (not shown) and denergizes relay 424. This opens contacts 424a which deenergizes solenoid 104 and disengages clutch 69 to stop elevator E and its associated conveyors 16 and 64.

The machine is now ready for the rolling of the second ball of the same frame. After this ball arrives in pit P, the machine starts and table 101 moves down. The respotters 103 are inactive and do not pick up any pins which remain standing. Table 101 then rises. During this interval, the grippers N are moved back and forth but frame F is not lowered when grippers N are located above station M as the conveyor 66 neither has its cups loaded, nor located at pin delivery station M.

Sweep S now operates and sweeps all pins fallen and standing into the pit. Table 101 then turns 180°, descends and spots on the alley the ten pins which were in the spotter cups. Table 101 then rises and turns back to its original position.

In the meantime the above referred to cam on shaft 255 (not shown) effects the energization of relay 424 and holds its contacts 424a closed because switch 225 is at this time closed. Therefore, since relay 428 is still locked in and its contacts 428b are closed, the elevator E and conveyors 16 and 64 start operating.

Pins removed from pit P are elevated, as previously mentioned, and are conveyed to the remaining awaiting cups of conveyor 66. Conveyor 66 is indexed, one at a time, as previously mentioned. This operation continues until the desired number of cups, usually ten, are loaded. When the tenth cup is loaded, conveyor 66 starts forward and the lug 218 on the No. 1 cup closes switch 226. This energizes relay 412 which is locked in by its contacts 412a. Closing of contacts 421b energizes solenoid 208 which allows clutch 200 to engage and advance the loaded train of cups to pin delivery station M.

At the same time that lug 218 on the No. 1 cup closes switch 226, it also opens switch 219 which deenergizes relay 428 thereby effecting the disengagement of clutch 69 and stopping the operation of conveyor E and its associated conveyors 16 and 64.

As the No. 1 cup arrives near the end of its travel at station M, lug 218 opens switch 230 which deenergizes relay 412 and solenoid 208. This disengages clutch 200 and stops the loaded train of cups at pin delivery station M in a position ready to have the pins removed by grippers N of the transfer conveyor frame F.

At the same time that lug 218 on the No. 1 cup opens switch 230, it also momentarily opens switch 225. This momentarily deenergizes relay 424, but it is reenergized as soon as the lug 218 clears switch 225 because the cam on shaft 255 (not shown) still has its switch (not shown) in a closed position.

If all pins are knocked down or a strike in made by the first ball of a frame, the arrival of the ball in the pit causes the machine operation to start as described hereinabove. Table 101 is lowered to test for the presence or absence of standing pins and then rises. Grippers N remove pins from cups 164 and deliver them to spotters 99. Conveyor 66 is actuated in the manner described hereinabove to return No. 1 cup 164 to loading station L. In the meantime sweep S has swept any fallen pins on the alley or in the gutters into the pit whence they have been removed by apron 10 and delivered by conveyors E and 64 to cups 164 which are indexed as the result of the arrival of a pin in a cup through the closing of switch 217 until after ten cups are loaded the entire assembly is advanced to station M where the loaded cups remain until switch 410 is again closed indicating that all pins have been removed therefrom for delivery to spotters 99.

The control mechanism for distinguishing between a ten ball frame and a strike does not form a part of the present invention and, therefore, it is deemed unnecessary to illustrate and describe it in detail. In Figure 8 the machine control is designated generally by the reference 422. As noted above this mechanism can be the same as shown and described in the above referred to Broekhuysen patent.

The invention above described may be varied in construction within the scope of the claims, for the particular device, selected to illustrate the invention, is but one of many possible concrete embodiments of the same. It is not, therefore, to be restricted to the precise details of the structure shown and described.

What we claim is:

1. In a bowling pin spotting machine, a pin loading station, a pin delivery station, an endless conveyor mounted for movement along a substantially triangular path of movement, a plurality of pin receiving and supporting holders mounted in fixed spaced relation along said conveyor, means for advancing said conveyor step by step to position holders successively at said loading station for delivery of a pin thereinto, means operative during said step by step movement of said conveyor for delivering a vertically positioned pin to each of said holders, control means operative when each of said holders contains a pin for causing said means to move said conveyor continuously to position all of said loaded holders at said pin delivery station, and means operative in response to the arrival of all of said loaded pin holders at said delivery station for stopping the movement of said conveyor.

2. In a bowling pin spotting machine, a pin loading station, a pin delivery station, a conveyor, a series of pin receiving and supporting holders mounted in spaced relationship on said conveyor, mechanism for driving said conveyor intermittently to position empty holders of said series in succession at said loading station for loading, means at said loading station operative when an empty holder is located at said loading station for delivering a pin into said holder, selective mechanism including conveyor driving control means operative upon completion of the loading of a predetermined number of said holders at said loading station to drive said conveyor driving mechanism continuously to position all of said loaded holders at said delivery station, and means operative upon arrival of said series of loaded holders at said delivery station for interrupting the operation of said conveyor driving mechanism.

3. In a bowling pin spotting machine, conveying mechanism for removing bowling pins from the pit of a bowling alley, an endless pin receiving conveyor, supports mounting said conveyor for movement in a closed circuitous path of travel, a pin delivery station, spaced pin supports mounted upon and extending along said conveyor, driving means for said conveyor, means for operating said driving means for moving said conveyor to travel said supports along one portion of said closed circuitous path of travel to locate empty supports in position to receive bowling pins delivered thereto by said mechanism, means operable when each of a predetermined number of supports contains a pin for moving said pin loaded supports in spaced aligned relationship along another portion of said path of travel to position all of said filled holders at said delivery station, and means operative in response to the arrival of said predetermined number of pin loaded supports at said delivery station for stopping the movement of said conveyor.

4. In a bowling pin spotting machine, a delivery station, an endless conveyor, supports for said conveyor constructed and arranged to mount said conveyor for travel in a closed substantially triangular path, spaced pin supporting holders carried by said conveyor, a pin loading station adjacent an apex of said triangular path, conveyor driving mechanism including means for selectively effecting intermittent movement of said conveyor to locate successive empty holders at said loading station, said driving mechanism also including means for selectively effecting continuous movement of said conveyor, and means responsive to the loading of a predetermined number of holders at said loading station for operating said last named means of said driving mechanism for effecting said continuous movement of said conveyor to move said conveyor to locate said loaded holders at said delivery station along the base of said triangular path of travel of said conveyor.

5. In a bowling pin spotting machine, a pin loading station, a pin delivery station, a conveyor, conveyor driving mechanism, a plurality of spaced pin holders carried by said conveyor, trip means actuated by pins entering said holders for actuating said mechanism for intermittently advancing said conveyor to locate empty holders in succession at said loading station for loading, conveyor driving mechanism control devices, and holder supported actuating means coacting with said devices for controlling the movement of said conveyor to deliver a predetermined number of loaded holders to said delivery station.

6. In a bowling pin spotting machine, a pin loading station, a pin delivery station, a conveyor, conveyor driving mechanism, a plurality of pin holders carried by said conveyor, trip means actuated by pins entering said holders for actuating said mechanism for advancing said conveyor to locate each empty holder at said loading station for loading, trip means carried by a selected holder for controlling the operation of said driving mechanism to effect the movement of a predetermined number of loaded holders to said delivery station, and transfer mechanism located at said delivery station for effecting the removal of pins from said holders.

7. In the machine defined in claim 6, a trigger located at said pin delivery station, and means actuated by the engagement of said trip means on said holder with said trigger for stopping the operation of said conveyor driving mechanism and the movement of said conveyor.

8. In a bowling pin spotting machine, a pin loading station, a pin delivery station, a conveyor, a plurality of pin supporting cups mounted in spaced relationship along said conveyor, mechanism for driving said conveyor to locate empty cups at said loading station for filling, and filled cups at said delivery station for unloading, said mechanism including a drive shaft, a one revolution clutch, means operated in response to the arrival of a pin in an empty cup at said loading station for operating said clutch and driving said shaft through one revolution to advance an empty cup into filling position, and means operative in response to the delivery of a pin to the last empty cup of a predetermined number of cups for actuating said clutch continuously to drive said shaft through a predetermined number of consecutive revolutions to effect the delivery by said conveyor of all of said loaded cups to said delivery station.

9. In a bowling pin spotting machine, a pin loading station, a pin delivery station, a conveyor, a plurality of pin supporting cups mounted in spaced relationship along said conveyor, mechanism for driving said conveyor to locate empty cups at said loading station for filling and filled cups at said delivery station for unloading, said mechanism including a drive shaft, a one revolution clutch, means operated by the arrival of a pin in an empty cup at said loading station for operating said clutch and driving said shaft through one revolution to advance an empty cup into filling position at said loading station, means operative when a predetermined number of cups have been loaded for actuating said clutch continuously to drive said shaft through a predetermined number of successive revolutions to effect the delivery of all of said loaded cups to said delivery station, and means for incapacitating said clutch and stopping said conveyor upon completion of the delivery by said conveyor of said pin loaded cups to said station.

10. In a bowling pin spotting machine, conveying mechanism for removing pins from the pit of a bowling alley and elevating said pins to a loading station, a pin delivery station remote from said loading station, an endless transfer conveyor, a plurality of pin holders carried by and extending along said transfer conveyor, conveyor supporting means for positioning said holders at said delivery station in substantially straight-line formation, means for driving said mechanism and conveyor, control mechanism including means for intermittently actuating said driving means of said transfer conveyor to present in succession a predetermined number of empty holders at said loading station to receive bowling pins delivered thereto by said conveying mechanism, and means for stopping the operation of said driving means and the movement of said conveyor when said predetermined number of loaded holders are arranged in said straight line formation at said delivery station.

11. In a bowling pin spotting machine, conveying mechanism for removing pins from the pit of a bowling alley and elevating said pins to a loading station, a pin delivery station remote from said loading station, an endless transfer conveyor, driving mechanism for said transfer conveyor, a plurality of pin holders carried by and extending along said transfer conveyor, means for operating said driving mechanism, control mechanism including means for intermittently actuating said driving mechanism of said transfer conveyor to present in succession a predetermined number of empty holders at said loading station to receive bowling pins delivered thereto by said conveying mechanism, and means operated automatically by the arrival of a pin in the last of said succession of holders when all of said other holders are filled for operating said driving means continuously to impart continuous movement to said transfer conveyor to deliver said loaded holders to said delivery station.

12. In a bowling pin spotting machine, a delivery station, an endless conveyor, conveyor driving mechanism, spaced pin holders carried by said conveyor, a pin loading station, a pin actuated trigger adjacent said loading station, conveyor driving control mechanism actuated by said trigger to intermittently actuate said conveyor driving mechanism to advance said conveyor and locate an empty holder in pin loading position upon engagement of said trigger by a pin entering an empty holder, and means operative upon delivery of the last of a predetermined number of pins into a holder at said loading station for causing said conveyor driving mechanism to operate said conveyor and move all of said loaded holders to said delivery station.

13. In a bowling pin spotting machine having a pin spotter, a pin loading station, a pin delivery station, a conveyor, a plurality of spaced aligned pin supports secured to said conveyor for travel therewith from said pin loading station to said pin delivery station, driving mechanism for said conveyor, said mechanism including control means for selectively operating said mechanism intermittently during the delivery of individual bowling pins into said supports at said loading station, and for imparting continuous movement to said conveyor to travel a predetermined number of loaded supports to said delivery station, means for delivering said pins from said loaded supports to said spotter, a conveyor stopping device, and means carried by one of said supports engaging said device for stopping said conveyor upon the arrival of all of said loaded supports at said delivery station.

14. In a bowling pin spotting machine, a pin loading station, a delivery station, a conveyor, a plurality of pin receiving and supporting holders mounted in fixed, equally spaced relation on said conveyor, means for advancing said conveyor along one path of travel to position empty holders successively at said loading station for delivery of a pin thereinto, means operative at said loading station for delivering a vertically positioned pin to each of said holders, means for advancing said conveyor and traveling all of said pin loaded holders in substantially a straight line at an angle to the original path of movement of said holders on said conveyor for delivering said loaded holders to said delivery station, means operative in response to the arrival of all of said pin loaded holders on said conveyor at said delivery station for stopping the movement of said conveyor, a pin spotter, and a pin transfer adapted to engage and simultaneously transfer all of said pins from said holders to said pin spotter.

15. In a bowling pin spotting machine, a loading station, a pin delivery station spaced from said loading station, a conveyor extending in a substantially horizontal plane from said loading station to said delivery station including endless traveling members, a plurality of equidistantly spaced pin supports fixedly attached to said members, means for advancing said conveyor step by step to locate empty supports in succession at said loading station for delivery of pins thereinto, means for delivering pins in succession to said holders at said loading station, and mechanism operative in response to the delivery of a pin into the last holder to be filled for moving said conveyor to travel all of said pin loaded supports along a straight line path of movement and locate said loaded supports in a side by side substantially equidistantly spaced substantially straight-line relationship at said delivery station.

16. In a bowling pin spotting machine, a loading station, a conveyor having a polygonal path of travel, a pin delivery station, a plurality of equidistantly spaced pin supports mounted on said conveyor, means for advancing said conveyor step by step along one straight-line portion of said path of travel to locate empty supports in succession at said loading station for delivery of a pin thereinto, means for delivering pins in succession to said supports at said loading station, mechanism operative when all of said supports contain a pin for moving all of said loaded supports in a different straight-line portion of said path of travel to said pin delivery station, whereby said pins in said supports are aligned in spaced straight-line arrangement, means operative in response to the arrival of all of said loaded supports at said pin delivery station for stopping said conveyor, a pin spotter, and a pin transfer adapted to engage and simultaneously transfer all of said pins from said holders to said pin spotter.

17. In a bowling pin spotting machine, a pin loading station, a pin delivery station, a conveyor, a plurality of pin supporting cups mounted in spaced relationship on said conveyor for travel therewith, mechanism for driving said conveyor to deliver empty cups in succession to said pin loading station including a drive shaft, a one-revolution clutch, and a selectively operated solenoid for operating said clutch; controls located at spaced positions along the path of movement of said conveyor including a plurality of switches, an electric circuit connecting said switches and solenoid, a trigger located at said loading station and in position to be engaged by a pin entering a cup for operating one of said switches to energize said solenoid upon the arrival of a pin in each cup of said succession of cups for successively indexing said conveyor to successively advance empty cups for receipt of a pin, trigger means mounted on said conveyor to engage another of said switches for energizing said solenoid to actuate said clutch to drive said shaft, means for maintaining the energization of said solenoid operative in response to the engagement of said trigger means with said last-named switch in response to the movement of the last holder from said loading station to drive said shaft for a predetermined number of consecutive revolutions, and other trigger means mounted on said conveyor and spaced from said first-named trigger means constructed and arranged to de-energize said solenoid and incapacitate said clutch and stop the movement of said conveyor upon delivery of a plurality of pin loaded cups to said pin delivery station.

18. In a bowling pin spotting machine, a pin spotter, a bowling pin assembling conveyor, means mounting said conveyor for travel in a closed substantially triangular path of movement, ten equidistantly spaced pin supporting holders carried by said conveyor, a pin delivery station, transfer means at said delivery station for effecting the removal of pins from said holders to said spotter, a pin loading station located adjacent the end of one leg of said triangular path, and mechanism for driving said conveyor to successively position empty holders at said loading station, said mechanism also including actuating means operative in response to the filling of a predetermined number of holders for moving said conveyor to advance said loaded holders along a second leg of said path and locate said holders in alignment along a third leg of said path proximate said delivery station.

RUPERT E. RUNDELL.
     PETER M. NEJEDLY.

References Cited in the file of this patent

UNITED STATES PATENTS

| Number | Name | Date |
|---|---|---|
| 2,319,925 | Flanagan | May 25, 1943 |
| 2,388,707 | Rundell | Nov. 13, 1945 |
| 2,388,708 | Bates | Nov. 13, 1945 |
| 2,390,302 | Henricksen | Dec. 4, 1945 |
| 2,531,167 | Simpson | Nov. 21, 1950 |